UNITED STATES PATENT OFFICE.

EDUARD BROEMME, OF ST. PETERSBURG, RUSSIA, AND RUDOLF STEINAU, OF NUREMBERG, GERMANY.

PROCESS OF RECOVERING ZINC FROM GALVANIZED-IRON ARTICLES.

1,042,315.  Specification of Letters Patent.  Patented Oct. 22, 1912.

No Drawing.  Application filed May 31, 1912. Serial No. 700,815.

*To all whom it may concern:*

Be it known that we, EDUARD BROEMME, a citizen of the Confederation of Switzerland, residing at St. Petersburg, in the Empire of Russia, and RUDOLF STEINAU, a citizen of the German Empire, residing at Nuremberg, Bavaria, in said Empire, have invented certain new and useful Improvements in Processes of Recovering Zinc from Galvanized-Iron Articles, of which the following is a specification.

The recovery of zinc from galvanized iron scrap, in particular pieces of galvanized sheet, wires, nails and the like of an average percentage of 6-9% of zinc by chlorination-roasting with common salt is not only incomplete, but also impractical, as large quantities of iron and manganese are dissolved, which can be removed by an expensive treatment only.

The process known for recovering the zinc from zinc ore which consists in the finely ground ore being treated either with a solution of sodium bisulfate or in a roasting oven with sodium bisulfate and a small addition of common salt and sulfuric acid cannot be employed for recovering zinc from galvanized iron scrap.

The present invention consists in that the iron scrap from which the zinc is to be recovered is treated in the presence of much water with quantities equivalent to the zinc of a mixture of alkali bisulfate and of a chlorid of a metal whose hydroxid has an alkaline reaction, such as alkali or earth alkali metals. This treatment may be carried out at ordinary temperature or for accelerating the reaction at boiling temperature or under steam-pressure.

Example: 100 kilos of galvanized iron scrap of 9% zinc is boiled with a solution of 20 kilos of sodium bisulfate and 20 kilos of common salt, until all zinc has gone into solution. A very pure solution of zinc chlorid, sodium sulfate and sodium chlorid containing traces only of iron and manganese will be obtained, which can be used for the production of lithophone.

By the alkali bisulfate and sodium chlorid are formed hydrochloric acid, sodium sulfate and hydrogen according to the following equation:

$$2NaCl + 2NaHSO_4 = 2HCl + 2Na_2SO_4 + 4H,$$

while the metallic zinc and hydrochloric acid form zinc chlorid and hydrogen according to the equation:

$$2HCl + Zn = ZnCl_2 + 2H.$$

By the complete removal of the zinc from the galvanized iron scraps are obtained nearly pure zinc-lyes which contain zinc chlorid, sodium sulfate and sodium chlorid and which when treated with barium sulfid according to the following equation:

$$ZnCl_2 + BaS + Na_2SO_4 = ZnS + BaSO_4 + 2NaCl$$

can be used directly for the manufacture of lithopone-white.

We claim:

1. The process herein described of recovering zinc from galvanized iron articles, which consists in treating said articles in the presence of an excess of water with a mixture of alkali bisulfate and alkali chlorid in quantities equivalent to the zinc to be recovered.

2. The process herein described of recovering zinc from galvanized iron articles, which consists in treating said articles in the presence of an excess of water with a mixture of alkali bisulfate and a chlorid of a metal whose hydroxid has an alkaline reaction.

In testimony, that we claim the foregoing as our invention, we have signed our names in presence of two subscribing witnesses.

EDUARD BROEMME.
RUDOLF STEINAU.

Witnesses as to the signature of Eduard Broemme:
H. A. LOVIAGUINE,
AUG. MIGHIS.

Witnesses as to the signature of Rudolf Steinau:
OSCAR BOCK,
RALPH W. DOX.